United States Patent [19]

Nanjyo et al.

[11] Patent Number: 5,251,084
[45] Date of Patent: Oct. 5, 1993

[54] TRANSDUCER HEAD BASE FOR MULTIPLE SIZE DRUMS

[75] Inventors: Shinichi Nanjyo, Miyagi; Minoru Shonai, Kanagawa; Futoshi Yoshida, Miyagi, all of Japan

[73] Assignee: Sony Corporation, Tokyo, Japan

[21] Appl. No.: 709,217

[22] Filed: Jun. 3, 1991

[30] Foreign Application Priority Data

Jun. 5, 1990 [JP] Japan .................. 2-59255[U]

[51] Int. Cl.⁵ .......................... G11B 5/53; G11B 21/24
[52] U.S. Cl. .......................... 360/104; 360/107
[58] Field of Search ...... 360/84, 85, 95, 130.2–130.24, 360/104, 107, 109

[56] References Cited

U.S. PATENT DOCUMENTS

| | | | |
|---|---|---|---|
| 4,823,218 | 4/1989 | Ibe et al. ............................ | 360/104 |
| 4,897,745 | 1/1990 | Binder-Kriegelstein ........... | 360/104 |
| 5,065,267 | 11/1991 | Yohda ............................... | 360/104 |

FOREIGN PATENT DOCUMENTS

| | | | |
|---|---|---|---|
| 60-131611 | 7/1985 | Japan ................................ | 360/107 |
| 61-74127 | 4/1986 | Japan ................................ | 360/104 |

*Primary Examiner*—Stuart S. Levy
*Assistant Examiner*—Craig A. Renner
*Attorney, Agent, or Firm*—Hill, Steadman & Simpson

[57] ABSTRACT

A head base which can be used with either of two different types of drums having a regular diameter and a smaller diameter. The head base comprises a single base plate having a transverse hole perforated therein in such a manner as to define a front portion, a rear portion and a pair of connecting portions which connect the front and rear portions to each other such that the front portion and the rear portion are capable of being separated from each other at the connecting portions. When the head base is to be used with a drum of a regular diameter of a rotary drum apparatus, it is used as it is. But when it is to be used with a drum of a smaller diameter, it is cut or broken at the connecting portions thereof to separate the front portion from the rear portion, and only the front portion is used as a head base.

9 Claims, 5 Drawing Sheets

TRANSDUCER HEAD BASE FOR MULTIPLE SIZE DRUMS

BACKGROUND OF THE INVENTION

1. Field of the Invention

This invention relates to a head base for securing a magnetic head element to a rotary drum apparatus.

2. Description of the Prior Art

Generally, a video head is supported on a head base and mounted on a rotary drum apparatus in the thus supported condition. An exemplary one of such conventional head base arrangements is shown in FIG. 7. Referring to FIG. 7, a conventional head base 1 shown has a mounting hole 2 formed at the center thereof for mounting the head base 1 onto a rotary drum apparatus. A video head element 4 is supported at an end portion 3 on a drum mounting datum surface 1a of the head base 1 while a terminal plate (not shown) is arranged on a rear face of the head base 1.

By the way, when a video head is to be designed, various structures are required depending upon the magnitude of the diameter of a drum of an object rotary drum apparatus for the designing. Such different video head structures will require individually different components, and accordingly, as the number of different types of video tape recorders or different sizes of rotary drum apparatus increases, also the number of parts increases. Naturally, the number of different types of head bases increases. This is not preferable for the production cost because the number of man-hours for the management of parts is increased in production control.

SUMMARY OF THE INVENTION

It is an object of the present invention to provide a head base which can be used with either of two different types of drums having a regular diameter and a smaller diameter.

In order to attain the object, according to the present invention, there is provided a head base which comprises a single base plate having a transverse hole perforated therein in such a manner as to define a front portion, a rear portion and a pair of connecting portions which connect the front and rear portions to each other such that the front portion and the rear portion are capable of being separated from each other at the connecting portions.

With the head base, when a head base is to be used with a drum of a regular diameter of a rotary drum apparatus, the head base is used as it is with the front and rear portions thereof left coupled to each other by way of the connecting portions, and a magnetic head is supported on the head base such that it extends over the front portion or over the front and rear portions.

On the other hand, when a head base is to be used with a drum of a smaller diameter, the head base is cut or broken at the connecting portions thereof to separate the front portion from the rear portion, and only the front portion is used as a head base and a magnetic head is supported on the head base consisting of the front portion.

In this manner, the head base can be applied to drums of the two different diameters. Accordingly, even if the number of different types of video tape recorders or of different sizes of rotary drum apparatus is increased, a possible increase in number of required types of head bases can be prevented. Accordingly, the number of man-hours for the management of parts can be decreased in production control.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
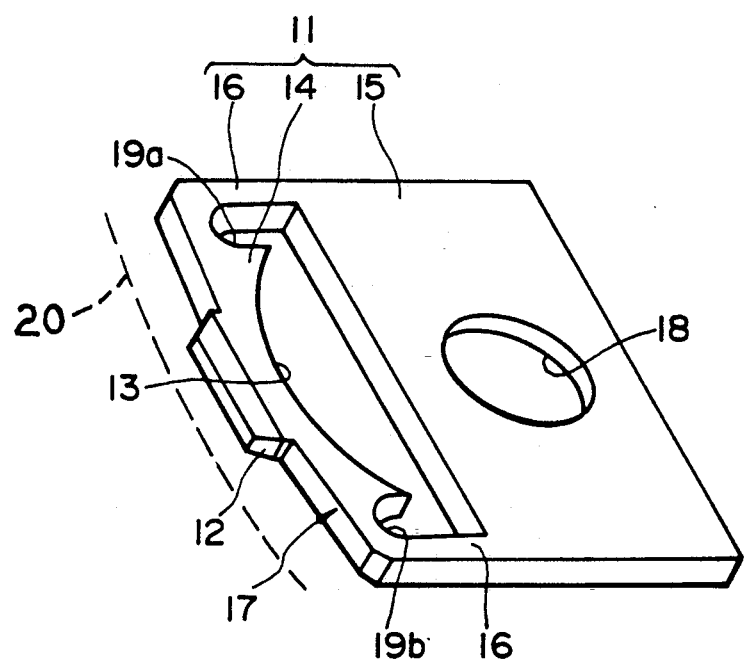
FIG. 1 is a perspective view of a head base showing a preferred embodiment of the present invention.

Referring first to FIG. 1, there is shown a head base to which the present invention is applied. The head base generally denoted at 11 is formed from a base plate, for example, from a metal base plate having a substantially rectangular shape in plan wherein a front side or edge 17 (left-hand side in FIG. 1) presents an arcuate line corresponding to a diameter of a drum (shown diagrammatically by the dashed line 20) for which a magnetic head element (not shown) to be mounted on the head base 1 is used. A projected portion 12 is formed at a central portion of the arcuate front side 17 of the head base 1. A transversely elongated hole 13 is formed at a mid portion of the head base 11 in such a manner as to divide the head base 11 into a front portion 14 and a rear portion 15 which are interconnected by way of a pair of connecting portions 16 on the opposite sides of the hole 13.

The overall size of the head base 11 is set in accordance with a regular drum diameter of a rotary drum apparatus. The front portion 14 of the head base 11 is formed such that it may serve as a head base for a smaller diameter drum when it is separated from the rear portion 15 at the connecting portions 16 as hereinafter described. Accordingly, the arcuate front side 17 of the head base 11 is formed in an arc corresponding to a diameter of such smaller diameter drum 20. A circular mounting hole 18 is formed at a central portion of the rear portion 15 of the head base 11 while a pair of mounting grooves 19a and 19b are formed in the front portion 14 of the head base 11 contiguously to the opposite ends of the transversely elongated hole 13.

The connecting portions 16 interconnecting the front portion 14 and the rear portion 15 of the head base 11 are formed such that they have a sufficient strength to maintain the structure of the head base 11 and but they can be cut or broken without having any influence on the front portion 14 (which may be, for example, in a condition wherein a head element is mounted thereon. The head base 11 can be formed by press work or etching.

Figure 2:
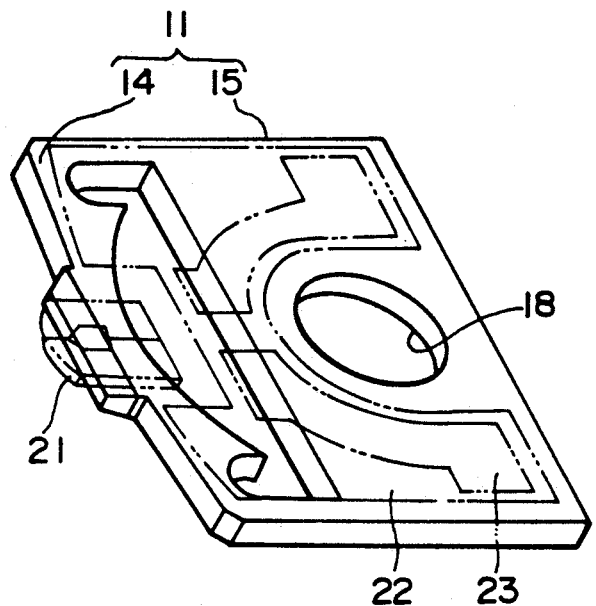
FIG. 2 is a similar view but showing the head base of FIG. 1 in a manner of use.

When the head base 11 of such construction as described above is to be used with a drum of the regular diameter, it is used in a condition wherein the front portion 14 and the rear portion 15 thereof remain coupled to each other, and a magnetic head element, that is, a video head element, 21 is securely mounted at the center of the front portion 14 of the head base 11 as seen in FIG. 2 (or in a condition wherein it extends over the front portion 14 and the rear portion 15). A terminal plate 22 having conductive terminals 23 thereon may be arranged on the face of the head base 11 on which the magnetic head 21 is securely mounted as shown in FIG. 2 or alternatively may be arranged, though not shown, on the opposite face of the head base 11. The head base 11 on which the magnetic head element 21 is securely mounted is mounted on a drum of an object rotary drum apparatus by means of fastening screws (not shown) or the like via the first mounting hole 18.

Figure 3:
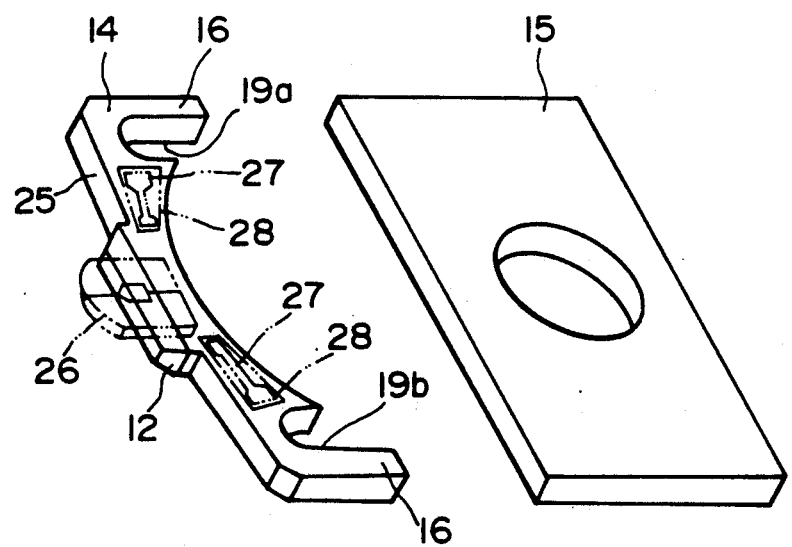
FIG. 3 is a perspective view showing the head base of FIG. 1 in another manner of use.

On the other hand, when the head base 11 is to be used with a drum of the smaller diameter, the head base 11 is cut or broken at the connecting portions 16 thereof to separate the front portion 14 and the rear portion 15 from each other as seen in FIG. 3, and the front portion 14 is used as a head base 25 and a magnetic head element, that is, a video head element, 26 is securely mounted onto the projected portion 12 of the head base 25. A pair of terminal plates 28 each having a conductive terminal 27 may be arranged on the face of the head base 25 on which the magnetic head 26 is securely mounted as shown in FIG. 3 or alternatively may be arranged, though not shown, on the opposite face of the head base 25. Actually, however, it is preferable to first securely mount the magnetic head 26 onto the front portion 14 and then cut or break the head base 11 to separate the front portion 14 and the rear portion 15 from each other. During such cutting or breaking, the rear portion 15 functions as a handling portion for the head base 25 formed only from the front portion 14. Then, the head base 25 consisting only of the front portion 14 on which the magnetic head 26 is securely mounted is mounted onto a drum of an object rotary head apparatus by means of fastening screws (not shown) via the second mounting grooves 19a and 19b.

It is to be noted that such a situation must be prevented that, when a cutting or breaking operation of the head base 11 into the front portion 14 and the rear portion 15 is performed in order to cope with a smaller diameter drum, some deformation takes place on the front portion 14 and has a bad influence on the accuracy in dimension of the head.

Figure 4:
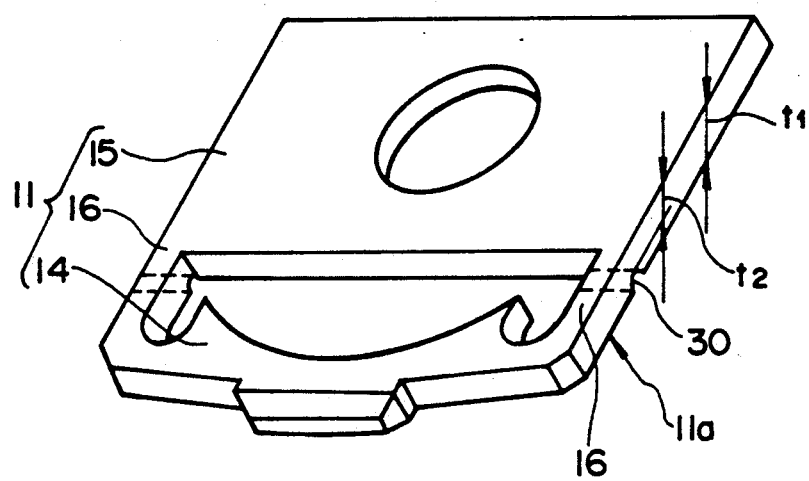
FIG. 4 is a perspective view of a modified head base.

To this end, the head base 11 is modified in such a manner as shown in FIG. 4 wherein a pair of grooves 30 are formed transversely on the connecting portions 16 of the head base 11 between the front portion 14 and the rear portion 15 such that they extend over the full widths (1 mm or less) of the connecting portions 16 so as to make the thickness $t_2$ at the connecting portions 16 smaller than the thickness $t_1$ of the other portions of the head base 11. The depth of the grooves 30 should be maximum within a range within which a sufficient structural strength and accuracy of the head base 11 can be maintained when the head base 11 is used as it is, and for example, such depth may be about a half or so of the thickness $t_1$ of the head base 11.

Such head base 11 as shown in FIG. 4 can be produced, for example, by etching. Upon such etching, half etching can be performed for the connecting portions 16 between the front portion 14 and the rear portion 15 of the head base 11 to form the grooves 30. Or else, when the head base 11 is to be produced by press work, half pressing can be performed for the connecting portions 16 between the front portion 14 and the rear portion 15 to form the grooves 30.

Such grooves 30 may be formed on a height datum surface 11a for the mounting of the head base 11 onto a drum (that is, a datum surface of the head base 11 to be contacted with a datum surface of a drum) or may alternatively be formed, though not shown, on the opposite surfaces of the head base 11.

Figure 5:
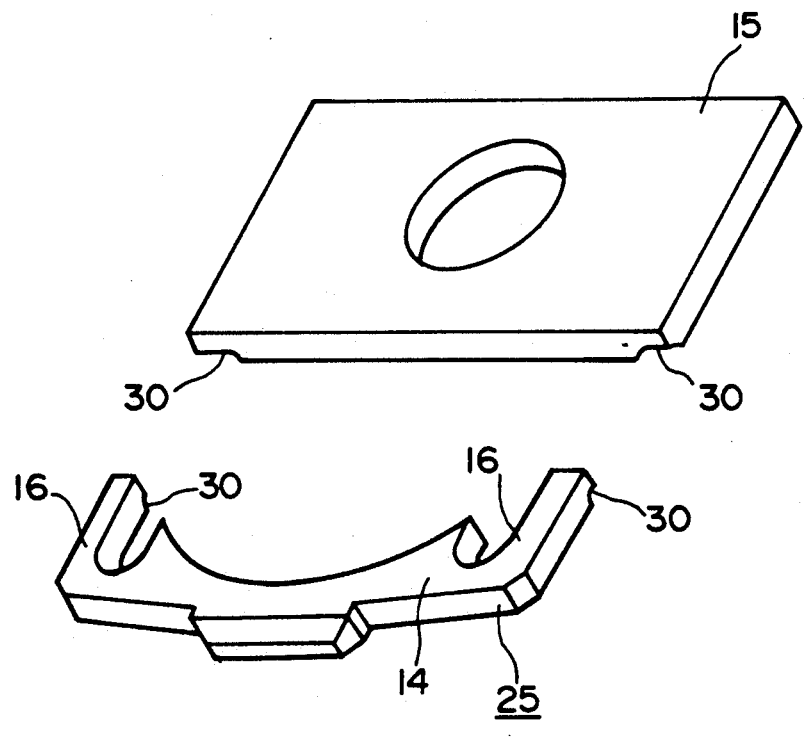
FIG. 5 is a fragmentary perspective view of the head base of FIG. 4.
Figure 6A:
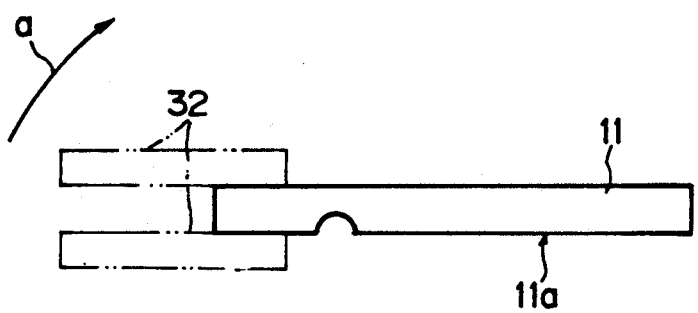
FIGS. 6A and 6B are schematic side elevational views of the head base of FIG. 4 illustrating a manner of use.
Figure 6B:
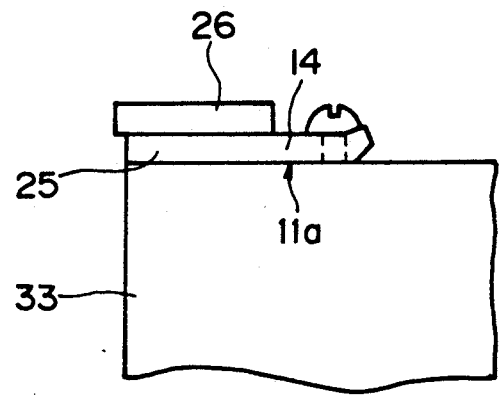
Figure 7:
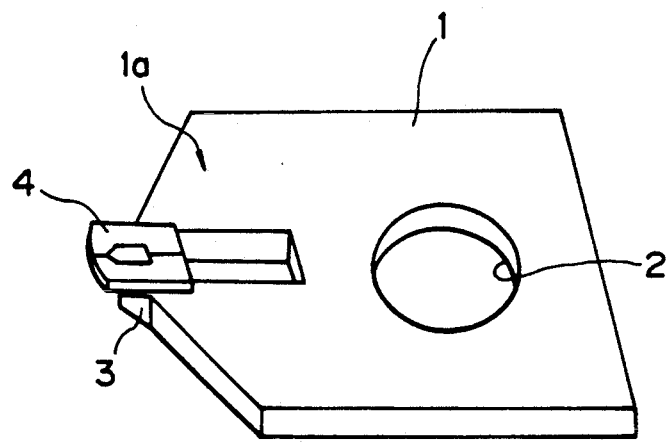
FIG. 7 is a perspective view showing a conventional head base.

When the head base 11 shown in FIG. 4 is to be assembled to a drum of the smaller diameter for an object, a cutting or breaking operation should be performed at the portions of the connecting portions 16 at the grooves 30 as seen in FIG. 5. Thus, the front portion 14 and the rear portion 15 can be separated from each other without causing deformation of or having an influence on the front portion 14. For such separation, the front portion 14 of the head base 11 is bent in a direction opposite to the grooves 30 as indicated by an arrow mark a in FIG. 6A using a jig 32 to break the head base 11. Consequently, end portions of the front portion 14 formed by such cutting are curved or bent a little. However, since the grooves 30 are formed on the datum surface 11a side of the head base 11, such end portions are curved away from the datum surface 11a of the head base 11 as seen in FIG. 6B. Consequently, such curved end portions of the head base 11 do not have any influence on mounting of the head base 11 onto a drum 33 as seen from FIG. 6B. Accordingly, the head base 25 can be mounted with a high degree of accuracy onto the drum 33.

With the head base 11 of the construction described above, it is used as it is with a drum of the regular diameter, but only the front portion 14 of the head base 11 is used with a drum of the smaller diameter. In this manner, the head base 11 provides alternative selection of a size of a head base in accordance with an object drum. Accordingly, even if the number of types of video tape recorders or sizes of drums is increased, either the entirety or part of the head base 11 can be used as a head base, and consequently, a possible increase in number of parts can be prevented. As a result, the number of man-hours for the management of parts can be decreased and the production cost can be decreased.

Further, where the grooves 30 are formed at the connecting portions 16 between the front portion 14 and the rear portion 15 of the head base 11 with a dimension sufficient for the connecting portions 16 to maintain a required structural strength, the head base 11 can be cut or broken readily without having such a bad influence as deformation upon the front portion 14, that is, upon accuracy and so forth of the front portion 14.

Having now fully described the invention, it will be apparent to one of ordinary skill in the art that many changes and modifications can be made thereto without departing from the spirit and scope of the invention as set forth herein.

What is claimed is:

1. A head base for supporting a transducing head, comprising a single base plate having a transverse hole perforated therein, said base plate having a front portion for supporting said transducing head, a rear portion and a pair of frangible connecting portions which connect said front and rear portions to each other, said base having an overall size set in accordance with a first diameter drum in a rotary drum apparatus, said rear portion of said head base having a first attachment portion for attachment to said first diameter drum when said rear portion is attached to said front portion, said connecting portions being readily cut or broken such that said front portion and said rear portion are separated from each other at said connecting portions, and said front portion of said head base having a second attachment portion for attachment to a drum of a second diameter smaller than said first diameter, when said front portion is separated from said rear portion.

2. A head base according to claim 1, said front portion having an arcuate side remote from said transverse hole, said arcuate side being formed in an arc in accordance with said second diameter drum.

3. A head base according to claim 1, wherein said first attachment portion includes a mounting hole formed in said rear portion while said second attachment portion includes a pair of mounting grooves formed in said front portion contiguously to the opposite ends of said transverse hole.

4. A head base according to claim 1, wherein a projected portion is formed at a central portion of a side of said front portion remote from said transverse hole and adapted to receive a magnetic head element thereon.

5. A head base according to any one of claims 1 and 2-4, wherein said connecting portions have a width not greater than 1 mm.

6. A head base according to claim 1, wherein a transverse groove is formed on a face of each of said connecting portions, each said face having a width in a direction transverse to a line extended between said front portion and said rear portion along its respective connecting portion, said transverse groove being formed over the full width of said face to facilitate separation of said front and rear portions from each other.

7. A head base according to claim 6, wherein the face on which said transverse groove is formed is a surface at which head base is to be contacted with a drum onto which said head base is to be mounted.

8. A head base according to claim 6, wherein each of said connecting portions has another face with a width in a direction transverse to a line extended between said front portion and said rear portion along its respective connective portions, and a similar transverse groove is formed on said another face of each of said connecting portions over the full width of said another face.

9. A head base according to any one of claims 6 to 8, wherein said connecting portions have, at portions thereof at the transverse grooves, a thickness equal to about a half of the thickness of the remaining portion of said base plate.

* * * * *